US008910765B2

(12) United States Patent
Min

(10) Patent No.: US 8,910,765 B2
(45) Date of Patent: Dec. 16, 2014

(54) LEFT AND RIGHT INTERCHANGING DEVICE FOR A LOCK CLUTCH

(76) Inventor: Yu Min, Shenzhen (CN)

(*) Notice: Subject to any disclaimer, the term of this patent is extended or adjusted under 35 U.S.C. 154(b) by 624 days.

(21) Appl. No.: 13/198,248

(22) Filed: Aug. 4, 2011

(65) Prior Publication Data

US 2011/0283757 A1 Nov. 24, 2011

Related U.S. Application Data

(63) Continuation-in-part of application No. PCT/CN2009/076213, filed on Dec. 31, 2009.

(30) Foreign Application Priority Data

Feb. 6, 2009 (CN) .......................... 2009 2 0130106

(51) Int. Cl.
*F16D 11/16* (2006.01)
*E05B 47/02* (2006.01)
*E05B 63/04* (2006.01)
*E05B 47/06* (2006.01)

(52) U.S. Cl.
CPC ............. *E05B 63/04* (2013.01); *E05B 47/0692* (2013.01)
USPC ................... 192/46; 192/71; 70/218; 70/224; 70/278.7

(58) Field of Classification Search
USPC ............................................................ 192/72
See application file for complete search history.

(56) References Cited

U.S. PATENT DOCUMENTS 3,896,644 A * 7/1975 Nagy et al. ...................... 70/149
4,526,256 A * 7/1985 Urdal .............................. 192/40
5,040,652 A * 8/1991 Fish et al. ....................... 70/189
5,862,903 A * 1/1999 Gruden et al. .......... 192/105 BB
6,622,534 B1 9/2003 Miller
7,975,823 B2 * 7/2011 Min ................................ 192/71
8,683,833 B2 * 4/2014 Marschalek et al. ............ 70/473
2011/0272237 A1 * 11/2011 Nunuparov .................. 192/84.7

FOREIGN PATENT DOCUMENTS

| | | |
|---|---|---|
| CN | 2489044 | 5/2002 |
| CN | 2931688 | 8/2007 |
| EP | 1 484 462 | 12/2004 |
| WO | WO2007/113010 | * 11/2007 |

* cited by examiner

*Primary Examiner* — Gene Crawford
*Assistant Examiner* — Mark Manley
(74) *Attorney, Agent, or Firm* — Jacobson Holman Hershkovitz, PLLC.

(57) ABSTRACT

A left and right interchanging device for a lock clutch includes a clutch pin, an inner rotary clutch shaft, and an outer rotary clutch shaft. The clutch pin is movably placed in a hole of the inner rotary clutch shaft and connected with a built-in driving module of the inner rotary clutch shaft. The module controls the clutch pin so that the clutch pin can retract into or extend out of the inner rotary clutch shaft. The inner rotary clutch shaft is placed in a central hole of the outer rotary clutch shaft, and both can rotate about a same central axis. A first stop edge and a second stop edge are provided on the inner rotary clutch shaft and connected with a driving output shaft. A third stop edge and a fourth stop edge are provided on the outer rotary clutch shaft and connected with a driving output and input shaft. When a door is left-opened, the third stop edge correspondingly contacts the clutch pin and the fourth stop edge correspondingly contacts the second stop edge. When the door is right-opened, the third stop edge contacts the second stop edge, and the fourth stop edge contacts the clutch pin.

2 Claims, 4 Drawing Sheets

LEFT AND RIGHT INTERCHANGING DEVICE FOR A LOCK CLUTCH

This application is a continuation-in-part of PCT/CN09/076213, filed Dec. 31, 2009, which has a priority of Chinese Application No. 200920130106.8, filed Feb. 6, 2009, hereby incorporated in its entirety by reference.

FIELD OF THE INVENTION

The present invention involves a part for locks, in particular a left and right interchanging device for a lock clutch.

BACKGROUND OF THE INVENTION

Currently, there are diversified clutch devices for locks.

SUMMARY OF THE INVENTION

The present invention provides a left and right interchanging device for a lock clutch by applying a simple mechanical structure. The simple structure is easy to use and is produced at low cost.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments herein that are substantially similar can use other components that have a different appearance.

Figure 1:
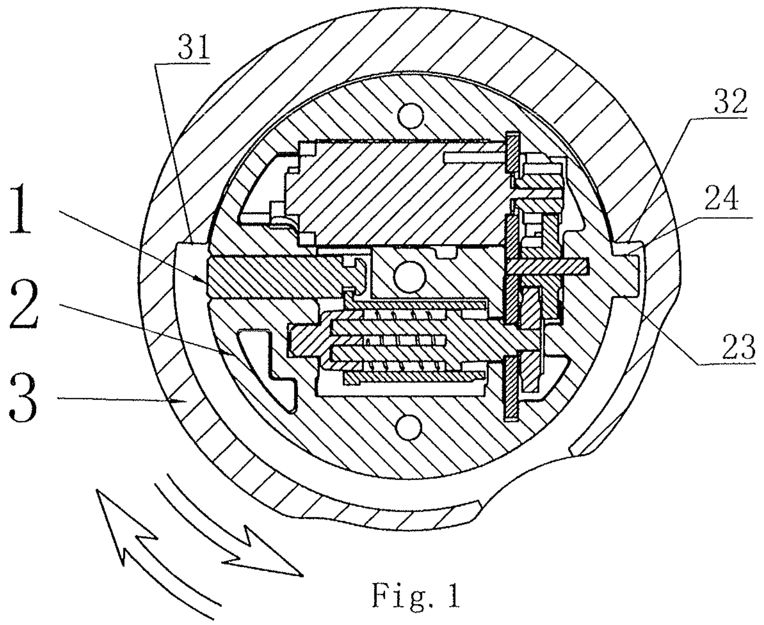
FIG. 1 is a sectional view of forward and backward rotation when a door is left-opened.

In the figures the elements are identified as follows: clutch pin 1; rotary clutch shaft 2; rotary clutch shaft 3; hole 21; driving module 22; first stop edge 23; second stop edge 24; third stop edge 31; and fourth stop edge 32.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

A left and right interchanging device for a lock clutch includes a clutch pin 1, a rotary clutch shaft 2, and a hollow rotary clutch shaft 3. The clutch pin 1 is movably placed in a hole 21 of the rotary clutch shaft 2, and connected with a built-in driving module 22 of the rotary clutch shaft 2. The module 22 controls the clutch pin 1, so that the clutch pin 1 can retract into or extend out of the rotary clutch shaft 2. The rotary clutch shaft 2 is placed in a central hole of the rotary clutch shaft 3, and both can rotate about a common central axis.

A first stop edge 23 and a second stop edge 24 are provided on the rotary clutch shaft 2. A third stop edge 31 and a fourth stop edge 32 are provided on the rotary clutch shaft 3. When a door is left-opened, the fourth stop edge 32 contacts the second stop edge 24. When the door is right-opened, the third stop edge 31 contacts the first stop edge 23.

Figure 3:
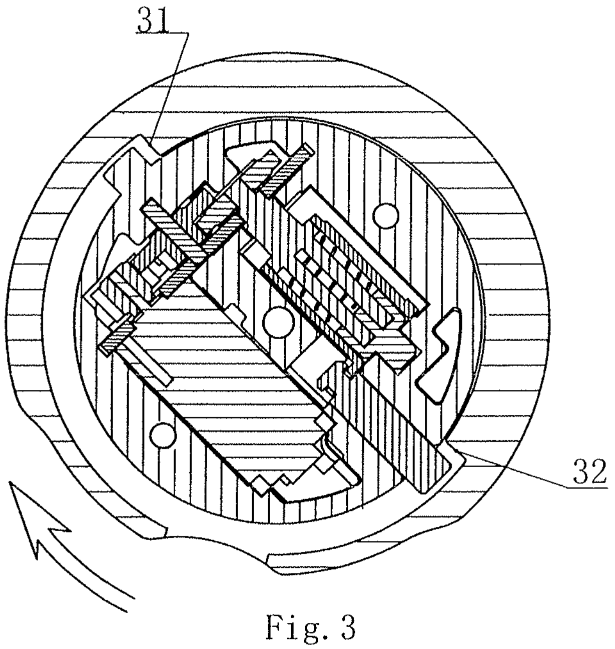
FIG. 3 is a sectional view of forward rotation when a door is right-opened and a fourth stop edge 32 contacts a clutch pin 1.

As shown in FIG. 3: right-opened and rotated forward. The rotary clutch shaft 3 rotates forward in a limit stroke. When the clutch pin 1 extends out of the rotary clutch shaft 2, the clutch pin contacts the fourth stop edge 32 of the rotary clutch shaft 3. The rotary clutch shaft 3 rotates to drive the rotary clutch shaft 2, rotating forward together, so that the door is opened.

Figure 4:
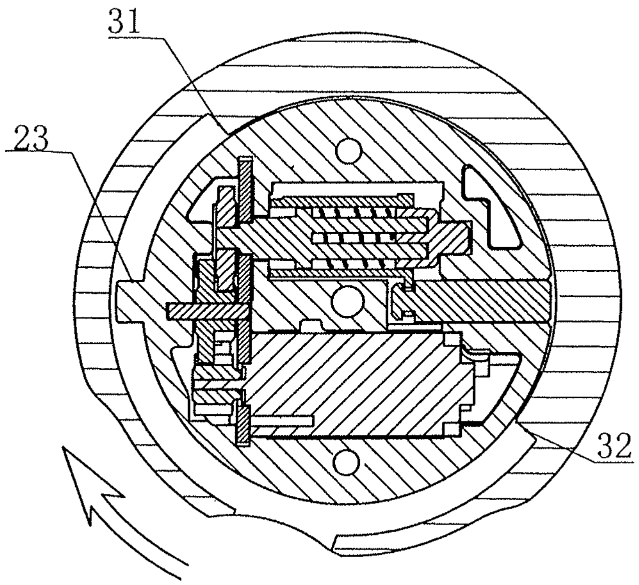
FIG. 4 is a sectional view of backward rotation when a door is right-opened and a fourth stop edge 32 does not contact the clutch pin 1.

As shown in FIG. 4: right-opened and rotated forward. When the clutch pin 1 retracts into the rotary clutch shaft 2, the clutch pin does not contact the fourth stop edge 32 of the rotary clutch shaft 3. When the rotary clutch shaft 3 rotates clockwise, the rotary clutch shaft 3 does not contact the rotary clutch shaft 2 through the clutch pin 1 so that the door is locked (FIG. 4).

Figure 5:
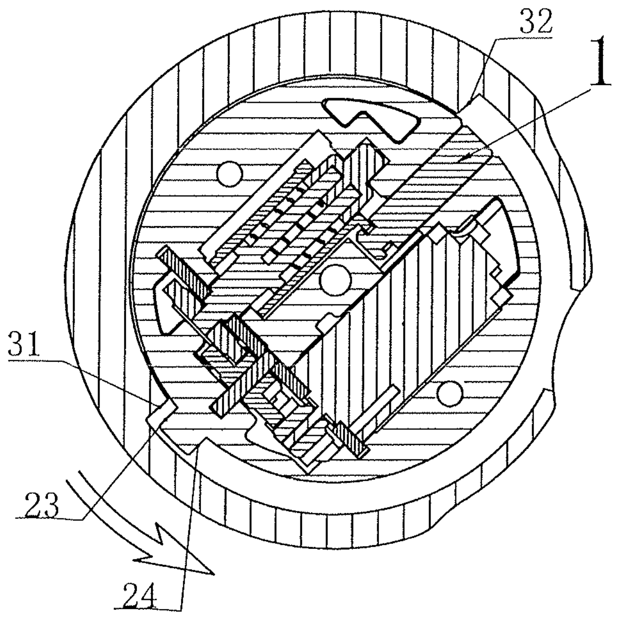
FIG. 5 is a sectional view of backward rotation when a door is right-opened.

As shown in FIG. 5: right-opened and rotated backward. The rotary clutch shaft 3 rotates backward in a limit stroke. Whether the clutch pin 1 extends out of the rotary clutch shaft 2 or not, the clutch pin 1 cannot contact the fourth stop edge 32, but the first stop edge 23 of the rotary clutch shaft 2 is contacted by the third stop edge 31 of the rotary clutch shaft 3. The rotary clutch shaft 3 rotates to drive the rotary clutch shaft 2 rotating backward, so that the door is reversely locked.

Figure 6:
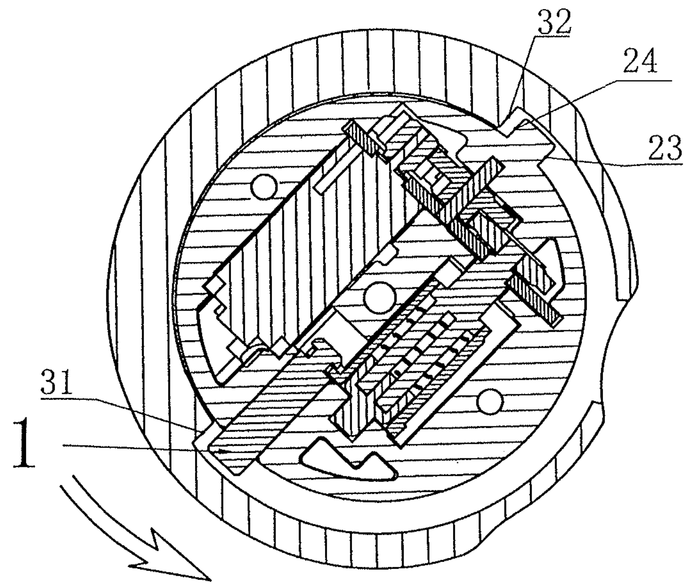
FIG. 6 is a sectional view of forward rotation when a door is left-opened and a third stop edge 31 contacts the clutch pin 1.

As shown in FIG. 6: left-opened and rotated forward. The rotary clutch shaft 3 rotates forward in the limit stroke. When the clutch pin 1 extends out of the rotary clutch shaft 2, the clutch pin contacts the third stop edge 31 of the rotary clutch shaft 3. The rotary clutch shaft 3 rotates to drive the rotary clutch shaft 2 rotating forward together, so that the door is opened.

Figure 7:
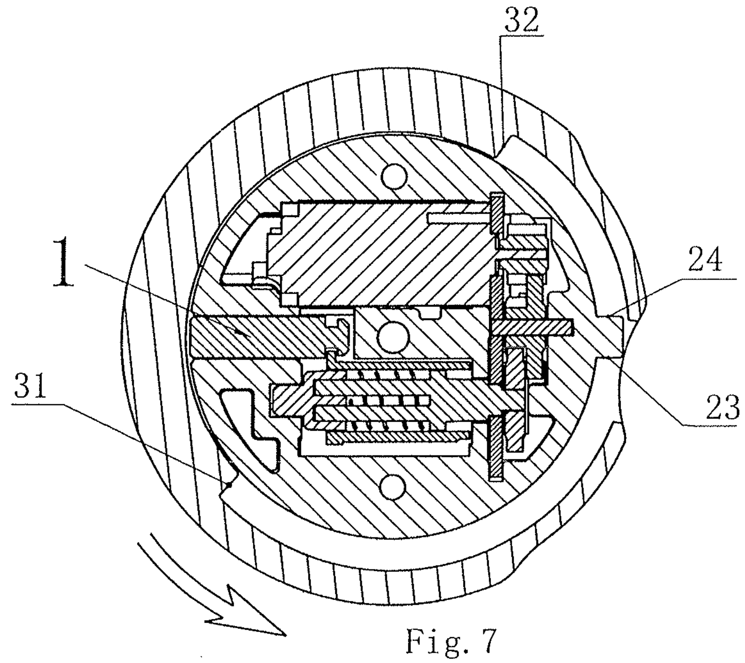
FIG. 7 is a sectional view of forward rotation when a door is left-opened and a third stop edge 31 does not contact the clutch pin 1.

As shown in FIG. 7, when the clutch pin 1 retracts into the rotary clutch shaft 2, the clutch pin 1 does not contact the third stop edge 31 of the rotary clutch shaft 3. The rotary clutch shaft 3 cannot rotate to drive the rotary clutch shaft 2 through the clutch pin 1. The rotary clutch shaft 3 rotates independently, so that the door is locked.

Figure 8:
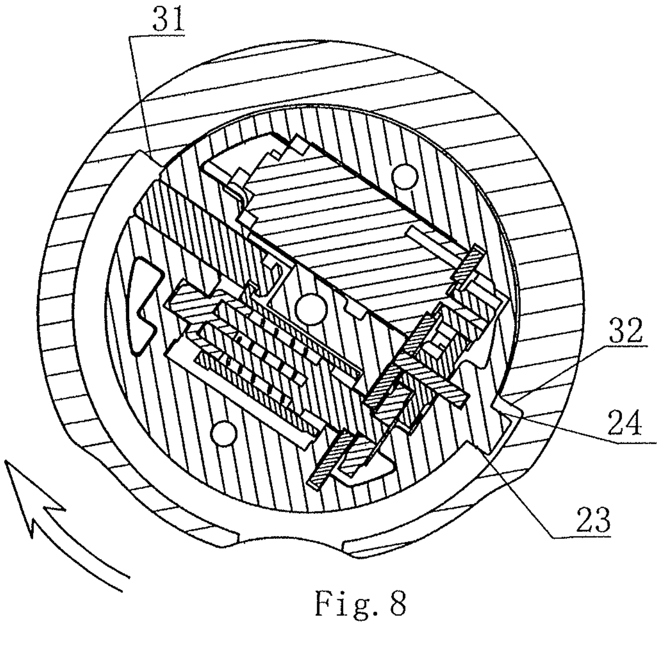
FIG. 8 is a sectional view of backward rotation when a door is left-opened.

As shown in FIG. 8: left-opened and rotated backward. The rotary clutch shaft 3 rotates backward in the limit stroke. Whether the clutch pin 1 extends out of the rotary clutch shaft 2 or not, the clutch pin cannot contact the third stop edge 31, but the second stop edge 24 of the rotary clutch shaft 2 contacts the fourth stop edge 32 of the rotary clutch shaft 3. The rotary clutch shaft 3 rotates to drive the rotary clutch shaft 2 rotating backward, so that the door is locked reversely.

Figure 2:
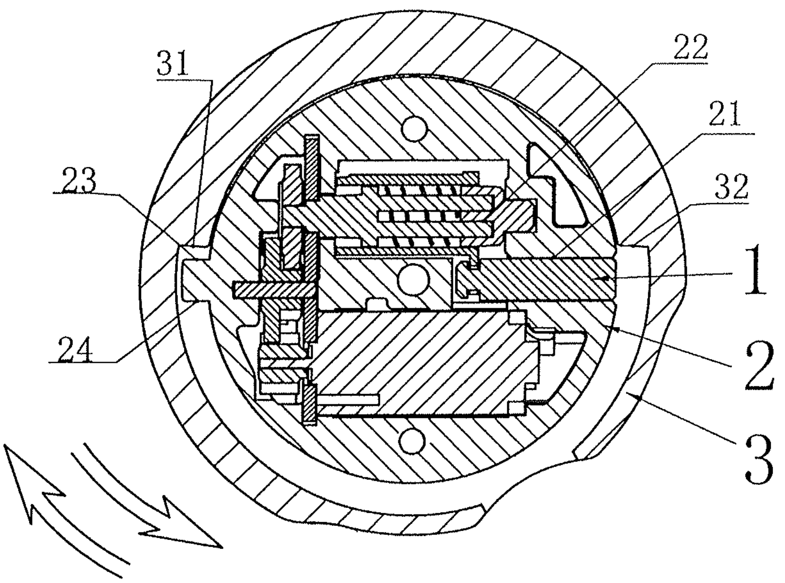
FIG. 2 is a sectional view of forward and backward rotation when a door is right-opened.

As shown in FIG. 2: When a door is right-opened, the fourth stop edge 32 correspondingly contacts the clutch pin 1, and the third stop edge 31 correspondingly contacts the first stop edge 23.

As shown in FIG. 1: When a door is left-opened, the fourth stop edge 32 correspondingly contacts the second stop edge 24, and the third stop edge 31 correspondingly contacts the clutch pin 1.

Interchange from left-opened to right-opened: The clutch pin 1 retracts into the rotary clutch shaft 2. When the rotary clutch shaft 2 rotates backward 180 degrees as shown in FIG. 2 (right-opened), the fourth stop edge 32 will contact the second stop edge 24, and the third stop edge 31 does not contact the first stop edge 23, so that right-opened is changed to left-opened.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A left and right interchanging device for a lock clutch, said interchanging device comprising a clutch pin, an inner rotary clutch shaft, and an outer rotary clutch shaft, the clutch pin being movably placed in a hole of the inner rotary clutch shaft, and connected with a built-in driving module of the inner rotary clutch shaft, the driving module controlling the clutch pin so that the clutch pin retracts into or extends out of the inner rotary clutch shaft, the inner rotary clutch shaft being located in a central hole of the outer rotary clutch shaft, and both the inner rotary clutch shaft and the outer rotary clutch shaft being rotated about a common central shaft axis;

wherein a first stop edge and a second stop edge are provided on a stopper extending from an outer surface of the inner rotary clutch shaft and connected with a driving output shaft, a third stop edge and a fourth stop edge are provided on the outer rotary clutch shaft and connected with a driving input shaft so that when a door is left-opened, the third stop edge directly contacts the clutch pin, and the fourth stop edge directly contacts the second stop edge and when the door is right-opened, the third stop edge directly contacts the first stop edge and the fourth stop edge directly contacts the clutch pin; and wherein the stopper with the first and second stop edges is non-retractable and in a 180 degree position from the clutch pin relative to the common central shaft axis.

2. The left and right interchanging device for a lock clutch according to claim 1, wherein the stopper is integral with the inner rotary clutch shaft, and the first stop edge is parallel to the second stop edge.

* * * * *